Nov. 3, 1964  S. GEWIRTZ  3,155,804
MERCURY AMALGAM ELECTRICAL CONTACTS
Filed March 26, 1962
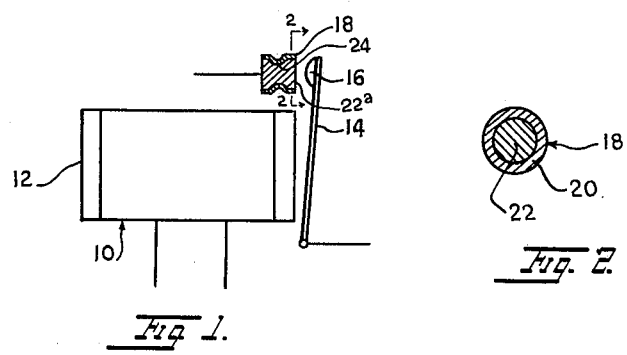
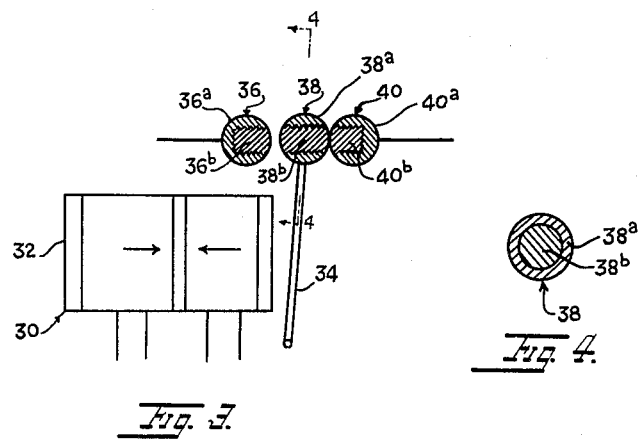
INVENTOR.
STANLEY GEWIRTZ
BY
ATTORNEY

United States Patent Office 3,155,804
Patented Nov. 3, 1964

3,155,804
MERCURY AMALGAM ELECTRICAL CONTACTS
Stanley Gewirtz, New York, N.Y., assignor to Solid State
Systems, Inc., New York, N.Y.
Filed Mar. 26, 1962, Ser. No. 182,512
3 Claims. (Cl. 200—166)

This invention is particularly applicable to high voltage and current contactors, relays and mechanical switches, dry circuit choppers, circuit breakers, dry circuit telephone exchange switching networks, welding circuits, and other applications requiring or benefiting from high speed switching, the dampening and practical elimination of contact bounce, and the electrical side effects thereof, low contact resistance, and long life. In short, the present invention may be applied wherever two electrically conductive surfaces are brought together for the purpose of switching, transferring or conducting a voltage or current, especially high voltage or current, from one circuit to another or from one part of a circuit to another part thereof.

The essential object of the invention is the provision of extremely fast-switching, long-lived electrical contacts which virtually, if not entirely, eliminate the many adverse and disruptive electrical side effects and results of conventional electrical contacts. As will hereinafter more fully be described, electrical contacts made in accordance with the present invention may have an effective operative speed of less than half a nanosecond. They have a prolonged usable life many orders of magnitude greater than conventional electrical contacts. They practically, and in many cases do actually, eliminate such undesirable effects as modulating voltages, arcing, plasma, plating, welding, pitting, structural deformation, premature aging, and mechanical fatigue and failure.

These adverse effects are generally caused by or result from many factors and conditions, such as dwell-time associated with the inertia of mechanical transference, mechanical hammering, contact bounce resulting from the charging and discharging of energy storage springs, the intermittent electrical interruptions associated therewith, and the many other disadvantages and difficulties normally connected with the transference of electricity from one circuit or part thereof to another.

Solutions to these problems have been sought in solid state circuitry. To some extent these efforts have succeeded, since in solid state circuitry long-lived operation and fast switching can be attained, and some of the disadvantages above mentioned may be eliminated. However, with each eliminated disadvantage a new and different disadvantage is generated. Thus, upon switch closure and transference of electrical energy, a residual resistance always remains in the circuit or across the switch or a stand-off voltage which is normally associated with solid state devices. This in turn acts as a series impedance with the circuit on one side of the switch, results in the dissipation of energy across the switch, and prevents a complete transference of energy to the circuit on the other side of the switch.

Another difficulty with solid state switching is current flow in the open circuit or Off condition. The normal leakage of the semi-conductor device shunts the open circuit, as does the capacitance of the semi-conductor junction, and consequently a circuit opened by a semi-conductor switch is essentially a closed circuit, although conducting at a substantially lower level than when the circuit is closed.

Another problem in semi-conductor switching arises from the fact that semi-conductor switching devices in present-day use are generally of the single-pole, single-throw type. These devices are in reality amplifiers, adapted to amplify a given input signal and causing a switching at the output terminals, or else the input signal triggers a junction into breakdown condition, resulting in conduction at the output terminals with consequent switching. Hence, solid state switching systems consist essentially of multiple groups of single-pole, single-throw devices stacked in series or parallel either on one side of a switch or as part of a flip-flop arrangement for double-throw transference, and the addition of each such device to other such devices to produce the desired series or parallel combinations requires an additional signal to activate each switching requirement individually. These signals are additive or cumulative, and despite the efficiency of solid state circuitry the power drain of such system will be substantial unless complementary symmetry is used.

The object of this invention is the provision of an electrical contact having the features and advantages above described and more particularly a mercury alloy or amalgam contact which combines the electrical and physical properties and charatceristics of liquid mercury with the mechanical, structural and electrical properties and characteristics of solid metals.

Specifically, the present invention provides an electrical contact made of a mercury amalgam and especially an amalgam in which mercury is alloyed with a metal or metals closely related to mercury in the electromotive series. Illustrative of these other metals are silver, gold and platinum, although the invention is not limited to a mercury-noble metal alloy. Since contact elements of necessity and by definition operate at least in related pairs, it is essential that the present mercury amalgam contact herein described and claimed be provided with a cooperative and cooperating contact element suited to take advantage of the features of a mercury amalgam. Hence the cooperating contact element may either be made of the same or a similar mercury amalgam, or it may be made of a solid metal, either pure or in alloyed form, as for example silver or a silver alloy and platinum or a platinum alloy. Suitable solid metal alloys are known to the art, as for example a 90–10 silver-copper alloy, or a silver-nickel-copper alloy, or the like.

Since the mercury amalgam may not be self-supporting, in the sense of being able to maintain its structural shape under pressure, impact, and in the presence of heat, it may be further necessary to encase the amalgam within a retaining ring or shell to provide the necessary structural support.

Essentially a mercury amalgam contact provides the advantages of two forms or states of matter, one being the liquid and the other being the solid state. The liquid phase provides a wet surface, capable of wetting a metal which is relatively close in the electromotive series. The liquid phase also provides the necessary dampening or cushioning action capable of absorbing the shock of a mechanical impart. The solid phase provides the necessary structural stability and strength.

Key facets of the present invention are molecular attraction and surface tension. When a mercury amalgam contact is brought together with a solid metal contact, all of the metals in both contacts being relatively close in the electromotive series, there is not only mechanical engagement between the two contacts; there is also, and more importantly, molecular attraction between the contacting metals. Mechanically, the presence of the mercury tends to dampen and absorb, and thereby practically eliminate contact bounce. When the two contact members are moved apart, the surface tension of the mercury provides an attenuated bridge which very abruptly and sharply breaks with a snap action, thereby causing a breaking or opening of the circuit of such short time interval as may be measured in nanoseconds.

It will be understood that the present invention may be practiced in terms of many mercury amalgams or alloys and proportions thereof. Naturally, the greater the mercury content the more effective will be the wetting action. A high content mercury amalgam, although progressively increasing in stability with time, never becomes as hard as the metal with which the mercury is alloyed.

The preferred amalgam, both for functional reasons and economy, is the mercury-silver amalgam, and preferably in the ratio or proportion of 60 to 40 parts by weight of mercury to silver. However, the range of proportions is extremely wide, as from approximately 20 to 75 parts by weight of mercury to approximately 80 to 25 parts by weight of silver. The specific requirements of each individual application or installation will determine the optimum proportions. For example, in some cases it will be more desirable to provide a wetter contact surface and less important to provide structural stability and rigidity. A greater proportion of mercury and a lesser proportion of silver or other solid metal would therefore be indicated. On the other hand, in other cases extreme wetability may be subordinated to enhanced structural stability and strength, and this condition or requirement would of course indicate the need for a smaller proportion of mercury and a larger proportion of solid metal alloyed therewith.

It will thus be seen that the contact members herein provided are characterized by the advantages and action of normal electromechanical or mechanical switch or relay contact elements. There is the same open circuit high resistance, the same ease of manufacture and assembly, especially in complicated switching networks, and all of the other advantages and beneficial properties and features of normal electromechanical and mechanical switching systems are also present. But in addition to these characteristics are the very special features hereinabove described. Thus there is a wetting action between contacts made in accordance with the present invention. There is molecular attraction between the molecules within each such contact and between molecules of co-operating contacts. Although contact bounce may be encountered, it is certainly dampened and absorbed almost to the vanishing point, and in any event the electrical side effects of such bounce are eliminated by a mercury bridge which is erected between cooperating contact members during the bouncing or rebounding phase of their interaction. Wetting, molecular attraction, and surface tension are responsible for this phenomenon, which remains true to the limits of the molecular attraction of one molecule of mercury to or for another. In actual tests with ten-ampere contacts, all electrical side effects of contact bounce were eliminated. When the action of the contacts is reversed in order to open the circuit, the speed of the circuit-breaking action will correspond to the speed at which two mercury molecules, molecularly attracted to each other and under maximum pressure will suddenly snap or spring apart. In short, the speed of switching is no longer dependent on the speed of the physical transference of mechanical contacts, but rather upon the molecular properties of mercury, silver and any other associated metals in the system.

The invention is illustrated in the accompanying drawing, in which:

FIGURE 1 is a schematic view, partly in section, of a relay having a contact element made in accordance with this invention.

FIGURE 2 is a sectional view through said contact element on the line 2—2 of FIGURE 1.

FIGURE 3 is another schematic view, partly in section, of a differential relay showing the use of a plurality of contact elements made in accordance with this invention.

FIGURE 4 is a sectional view through one of said contact elements taken on the line 4—4 of FIGURE 3.

It will be observed in the drawing that a conventional relay 10 is provided with an electromagnet 12 and a pivoted switch arm or armature 14 cooperative therewith. Mounted on the armature is a solid metal contact 16 made, in one form of the invention, of a silver-copper alloy in the proportions of approximately 90 parts by weight of silver to approximately 10 parts by weight of copper. Secured on or adjacent the electromagnet is a fixed contact member 18 situated for engagement with contact 16 which, by reason of its pivoted mounting, may be designated the movable contact of the relay.

It will be noted that fixed contact 18 comprises a generally cup-shaped shell 20 containing a mercury amalgam filler 22. The cup or shell 20 is made preferably of deep drawn copper or brass or any other suitable material. It may be pinched inwardly to form an internal annular rib or embossment 24, to help retain the amalgam filler. As appears from FIGURE 1 one face 22a of the amalgam filler remains exposed opposite movable contact 16, in order to provide a contact surface cooperative therewith. In one form of the invention the mercury amalgam filler 22 is an alloy comprising approximately 60 parts by weight of mercury and approximately 40 parts by weight of silver. This showing is of course purely illustrative and is intended merely as a graphic portrayal of only one of a great variety of embodiments and possibilities incorporating the principles and features of the present invention.

Another embodiment of the present invention is shown in FIGURES 3 and 4, wherein the invention is shown applied to a differential relay 30. This relay is provided with conventional electromagnetic means 32, a pivoted switch arm or armature 34 cooperative with said electromagnetic means, and a plurality of contacts 36, 38 and 40, respectively. Contacts 36 and 40 are fixed, while contact 38 is movable, being mounted on armature 34. All three contacts are identical in the sense that they comprise a broached shell and a mercury amalgam filler, the mercury amalgam having an exposed face or faces to serve as the contact portions or surfaces proper of the contact elements. Thus, contact 36 comprises an internally broached shell 36a and a mercury amalgam filler 36b. Contact 38 comprises an internally broached shell 38a and a mercury amalgam filler 38b. Similarly, contact 40 consists of an internally broached shell 40a and a mercury amalgam filler 40b. As shown in FIGURE 3, shell 38a is mounted on armature 34, and said shell is provided with two oppositely disposed openings through which the mercury amalgam filler is exposed on opposite sides, being engageable alternately with contacts 36 and 40 in accordance with the energization and operation of the relay.

What is claimed is:

1. An electrical contact made of a 60/40 mercury/silver amalgam.

2. An electrical contact comprising a shell containing a 60/40 mercury/silver amalgam filler which presents an exposed contact surface.

3. An electrical contact comprising an electrically conductive shell containing a 60/40 mercury/silver amalgam filler, said shell having an opening through which said mercury amalgam filler presents an exposed contact surface.

References Cited in the file of this patent

UNITED STATES PATENTS

| | | |
|---|---|---|
| 550,360 | Wurts | Nov. 26, 1895 |
| 1,648,100 | Aichele | Nov. 8, 1927 |
| 2,319,259 | Peterson | May 18, 1943 |
| 2,682,593 | Jenny | June 28, 1949 |
| 2,901,580 | Kelly | Aug. 25, 1959 |